United States Patent

(12) United States Patent  
Obayashi et al.

(10) Patent No.: US 7,896,558 B2  
(45) Date of Patent: Mar. 1, 2011

(54) THRUST ROLLER BEARING

(75) Inventors: Kousuke Obayashi, Fukuroi (JP); Kazuyuki Yamamoto, Hamamatsu (JP)

(73) Assignee: NTN Corporation, Osaka (JP)

( * ) Notice: Subject to any disclaimer, the term of this patent is extended or adjusted under 35 U.S.C. 154(b) by 704 days.

(21) Appl. No.: 11/806,950

(22) Filed: Jun. 5, 2007

(65) Prior Publication Data  
US 2007/0280575 A1     Dec. 6, 2007

(30) Foreign Application Priority Data

Jun. 6, 2006 (JP) .............................. 2006-157512  
Jun. 15, 2006 (JP) .............................. 2006-165583  
Jun. 21, 2006 (JP) .............................. 2006-171519  
Jul. 18, 2006 (JP) .............................. 2006-195126

(51) Int. Cl.  
F16C 33/46 (2006.01)

(52) U.S. Cl. ..................................................... 384/623

(58) Field of Classification Search ................. 384/470, 384/523, 525, 572, 573, 590, 606, 618, 619, 384/621, 623; 29/899.067  
See application file for complete search history.

(56) References Cited

U.S. PATENT DOCUMENTS 3,240,542 A * 3/1966 Jahn ............................ 384/623  
6,315,456 B1 * 11/2001 Tanimoto et al. ............ 384/527  
6,896,415 B2 * 5/2005 Ishiwada et al. ............ 384/517

FOREIGN PATENT DOCUMENTS

| JP | 61-82937 | | 4/1986 |
| JP | 7-151153 | | 6/1995 |
| JP | 11-336751 | | 12/1999 |
| JP | 11-351245 | A | 12/1999 |
| JP | 2000-18258 | | 1/2000 |
| JP | 2000-213546 | | 8/2000 |
| JP | 2001-105089 | | 4/2001 |
| JP | 2001-146922 | | 5/2001 |
| JP | 2002-120026 | | 4/2002 |
| JP | 2003-21146 | | 1/2003 |
| JP | 2003-83333 | | 3/2003 |
| JP | 2003-083333 | * | 3/2003 |
| JP | 2003-239981 | A | 8/2003 |
| JP | 2003-294038 | | 10/2003 |
| JP | 2004-301195 | * | 10/2004 |
| JP | 2005-164023 | | 6/2005 |
| JP | 2005-273755 | A | 10/2005 |
| JP | 2005-308137 | | 11/2005 |
| JP | 2006-71076 | | 3/2006 |

* cited by examiner

*Primary Examiner*—Thomas R Hannon  
*Assistant Examiner*—James Pilkington  
(74) *Attorney, Agent, or Firm*—Clark & Brody

(57) ABSTRACT

A thrust roller bearing comprises a plurality of rollers and a disk-shaped retainer having a plurality of pockets for holding the plurality of rollers and having an outer flange part bent in a rotation axis direction. The inner surface of the outer flange part forms the outer wall surface of the pocket and the outer wall surface of the pocket is processed by the ironing.

16 Claims, 8 Drawing Sheets

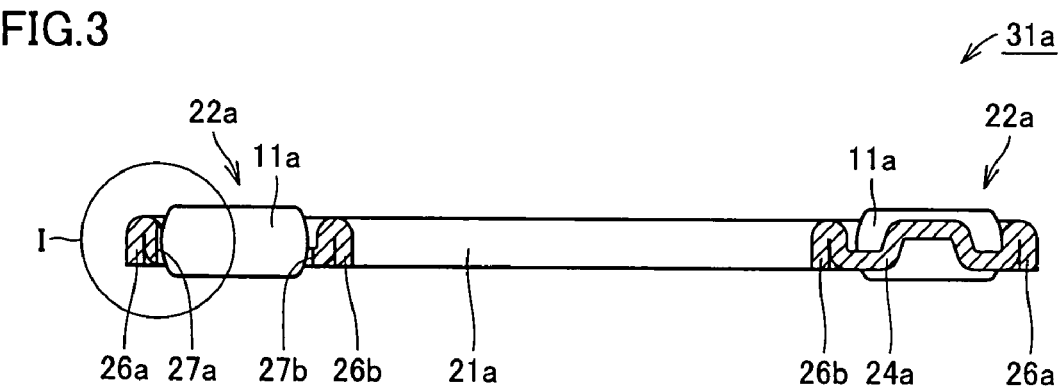
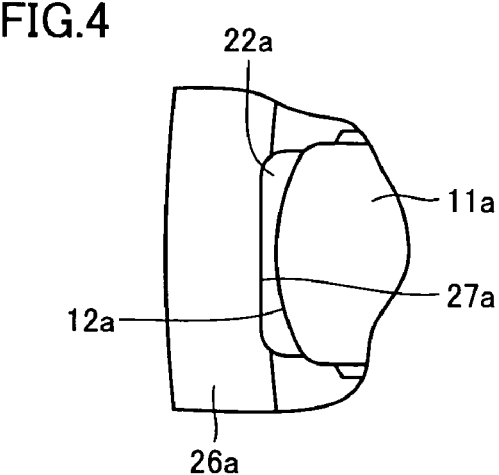
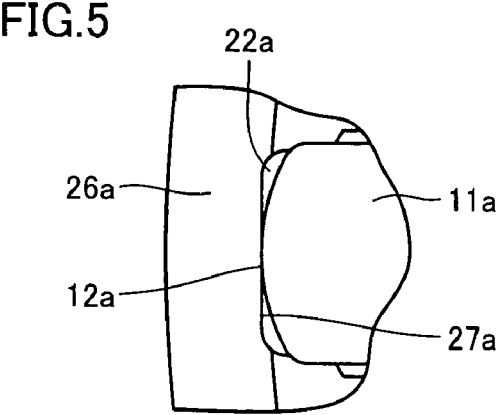

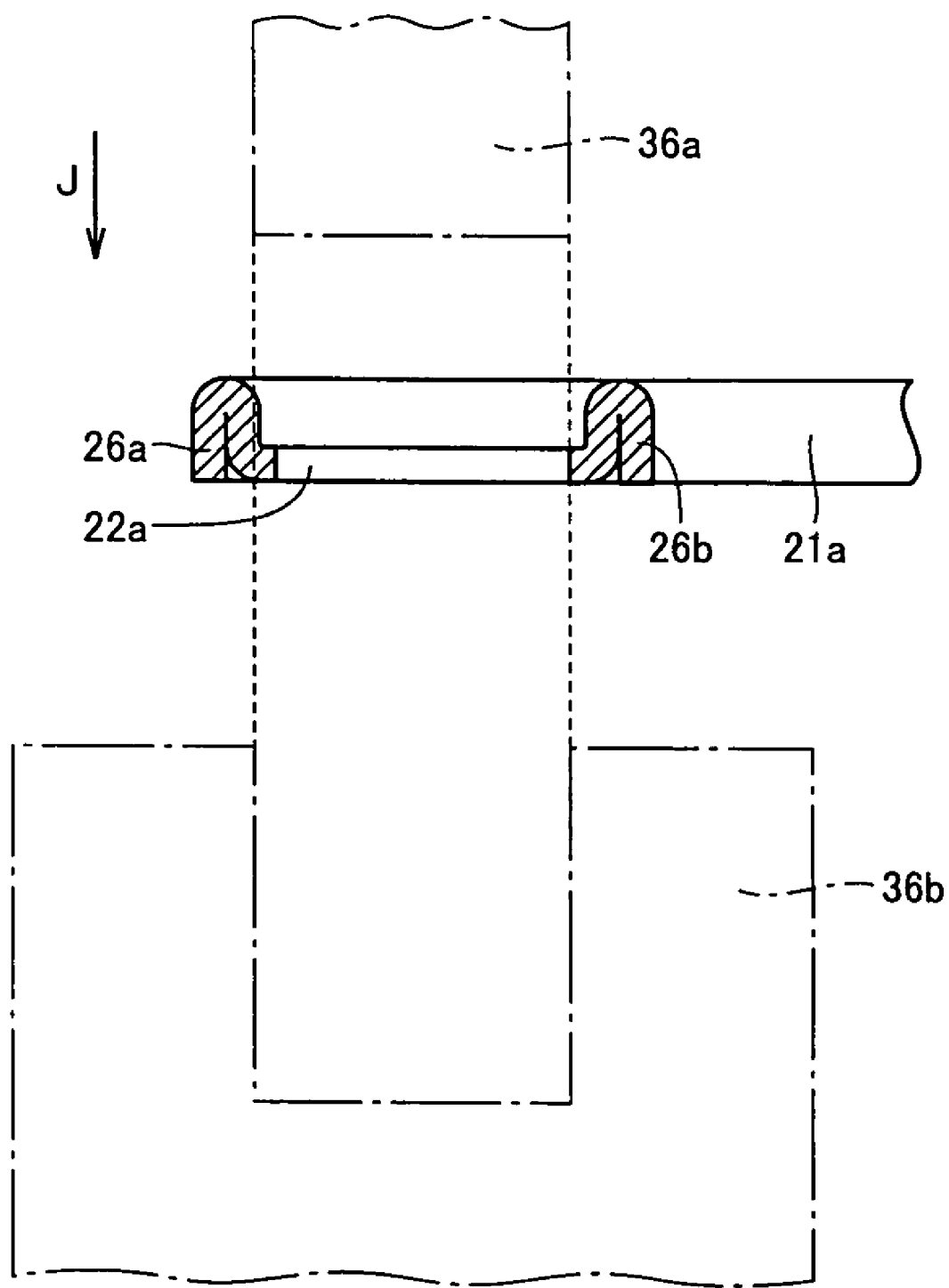

THRUST ROLLER BEARING

BACKGROUND OF THE INVENTION

1. Field of the Invention

The present invention relates to a thrust roller bearing and more particularly, to a thrust roller bearing that can be used under a thin lubrication or high-speed rotation environment.

2. Description of the Background Art

A thrust roller bearing used in a compressor for a car air conditioner, an automatic transmission, a manual transmission or a hybrid car is required to have characteristics that can be used under a severe usage environment such as a high-speed rotation or thin lubrication environment upon request of energy saving, miniaturization and high-power output of recent years. The thrust roller bearing that can be used under the severe usage environment is disclosed in Japanese Unexamined Patent Publication No. 2003-83333, Japanese Unexamined Patent Publication No. 2005-164023, or Japanese Unexamined Patent Publication No. 2004-301195.

Hereinafter, the manufacturing method of a retainer contained in the thrust roller bearing disclosed in the Japanese Unexamined Patent Publication No. 2004-301195 will be briefly described. First, pockets for holding rollers are punched out by a punch and the like. Then, an inner flange part of the retainer is formed by bending a part on the inner side of the retainer in the rotation axis direction. Then, an outer flange part that extends to the outer end of the pocket is formed by bending a part on the outer side of the retainer to be positioned, inside the outer end part of the pocket. Thus, the retainer is manufactured.

According to the Japanese Unexamined Patent Publication No. 2003-83333 and the Japanese Unexamined Patent Publication No. 2005-164023, the thrust roller bearing comprises rollers having the curved end surfaces and a retainer. Thus, sliding resistance between an outer end surface of the roller and an outer wall surface of the pocket can be small, so that wear of the outer wall surface of the pocket can be restricted.

In addition, according to the Japanese Unexamined Patent Publication No. 2004-301195, the outer wall surface of the pocket is comprised of the flange part bent in the rotation axis direction. Thus, the area of the outer wall surface of the pocket can be large and the contact surface pressure applied from the outer end face of the roller can be small, whereby the wear of the outer wall surface of the pocket can be restricted.

However, according to the retainers disclosed in the in Japanese Unexamined Patent Publication No. 2003-83333, the Japanese Unexamined Patent Publication No. 2005-164023, and the Japanese Unexamined Patent Publication No. 2004-301195, the outer wall surface of the pocket is the surface of an iron plate. The surface of the iron plate is a coarse surface and the degree of its surface roughness is low. In addition, even when the outer wall surface of the pocket is formed of the surface punched out by the punch, the degree of its surface roughness is also low. When the outer end face of the roller abuts on the outer wall surface of the pocket having low degree of surface roughness, drilling wear is generated. Here, the drilling wear means a phenomenon in which when the end face of the roller, the outer end face thereof, especially is pressed to the outer wall surface of the pocket due to centrifugal force and the like and further pressed thereto due to the rotation of the roller, abnormal wear is generated on the outer wall surface of the pocket. Especially under the above severe usage environment, this is conspicuous. Thus, the outer wall surface of the pocket is considerably worn out and thrust roller bearing is not expected to have a long life.

Furthermore, since force such as centrifugal force is applied to the outer wall surface of the pocket while the roller is rolling, when the outer wall surface of the pocket does not have enough strength, it could be damaged. In this case also, the thrust roller bearing is not expected to have a long life.

In addition, when the roller has a small diameter, it is difficult that the end face of the roller is appropriately in contact with the outer wall surface of the pocket through the above manufacturing method.

SUMMARY OF THE INVENTION

It is an object of the present invention to provide a thrust roller bearing capable of implementing a long life.

A thrust roller bearing according to the present invention comprises a plurality of rollers and a disk-shape retainer having a plurality of pockets for holding the plurality of rollers and having an outer flange part bent in a rotation axis direction. The inner surface of the outer flange part forms the outer wall surface of the pocket and the outer wall surface of the pocket is processed by the ironing.

In this constitution, when the outer end face of the roller abuts on the outer wall surface of the pocket while the roller rolls, the outer end face of the roller abuts on the surface processed by the ironing. Since the surface processed by the ironing is smooth and the degree of its surface roughness is high, drilling wear can be restricted. In addition, since the outer wall surface of the pocket is comprised of the outer flange part bent in the rotation axis direction, an area is large and a PV value can be small. Therefore, the wear of the outer wall surface of the pocket can be restricted and the long life of the thrust roller bearing can be implemented.

Preferably, the length of play for the roller in the rotation axis direction is shorter than the length of the surface processed by the ironing in the rotation axis direction. In this constitution, even when the roller moves within the length of its play in the rotation axis direction, the end face of the roller abuts on the surface processed by the ironing. Thus, the end face of the roller can surely abut on the surface processed by the ironing.

Further preferably, the amount processed by the ironing for the surface is not more than 20% of the thickness of the retainer. The ironing is performed to shape the surface of the plate such that the plate thickness of the retainer is reduced. Here, when the amount processed by the ironing, that is, the reduced amount is increased, the retainer becomes thin and the strength of the outer wall surface of the pocket could be insufficient. However, when the amount processed by the ironing is set so as to be not more than 20% of the retainer thickness, the strength of the outer wall surface of the pocket can be maintained.

Further preferably, the surface roughness Ra of the surface processed by the ironing is not more than 2 μm. In this surface roughness, the drilling wear can be restricted and the wear of the outer wall surface of the pocket can be reduced. Here, the surface roughness Ra is arithmetic average roughness.

Further preferably, the outer end face of the roller has a curved surface projected in a rolling axis direction. Thus, since the contact is made at a point having small peripheral speed, the PV value can be smaller and wear resistance can be improved.

A thrust roller bearing according to the present invention comprises a plurality of rollers and a disk-shaped retainer having a plurality of pockets for holding the plurality of rollers and having an outer flange part bent in a rotation axis direction. The inner surface of the outer flange part forms the outer wall surface of the pocket and the outer wall surface of the pocket is a curved surface dented to the outer periphery so as to follow the inner surface of the outer flange part and processed by the ironing.

In this constitution, when the outer end face of the roller abuts on the outer wall surface of the pocket while the roller rolls, the outer end face of the roller abuts on the surface processed by the ironing. Since the surface processed by the ironing is smooth and the degree of its surface roughness is high, drilling wear can be restricted. In addition, since the outer wall surface of the pocket is comprised of the outer flange part bent in the rotation axis direction, an area is large and the PV value can be small. Furthermore, since the outer wall surface of the pocket is the curved surface dented to the outer periphery so as to follow the inner surface of the outer flange part, the thickness of the wall surface in the diameter direction can be approximately uniform. Thus, the strength of the wall surface can be prevented from being lowered partially. Therefore, the wear of the outer wall surface of the pocket can be restricted and the long life of the thrust roller bearing can be implemented.

Preferably, when it is assumed that the curvature radius of the surface processed by the ironing is R1(mm), the curvature radius of the inner surface of the outer flange part bent in the rotation axis direction is R2 (mm), and the distance between the inner surface of the outer flange part and the outer wall surface of the pocket in the diameter direction is D (mm), relation such that R1=R2±10 mm+D is provided. In this constitution, the outer wall surface of the pocket can be appropriately formed, and the behavior of the roller can be stabilized.

Further preferably, the outer end face of the roller has a curved surface projected in the rolling axis direction. In this constitution, since the outer end face of the roller can appropriately abut on the outer wall surface of the pocket comprised of the curved surface dented to the outer periphery, its wear resistance can be improved.

Further preferably, when it is assumed that the curvature radius of the outer end face of the roller is R3 (mm), a relation such that R1>R3 is provided. Thus, since only the most projected outer end face of the roller having a small peripheral speed can be in contact with the outer wall surface of the pocket, its wear resistance can be improved.

In addition, a thrust roller bearing according to the present invention comprises a plurality of rollers and a disk-shaped retainer having a plurality of pockets for holding the plurality of rollers and having an outer flange part bent in a rotation axis direction. The inner surface of the outer flange part forms the outer wall surface of the pocket and the outer wall surface of the pocket is a flat surface and processed by the ironing.

In this constitution, when the outer end face of the roller abuts on the outer wall surface of the pocket while the roller rolls, the outer end face of the roller abuts on the surface processed by the ironing. Since the surface processed by the ironing is smooth and the degree of its surface roughness is high, drilling wear can be restricted. In addition, since the outer wall surface of the pocket is comprised of the outer flange part bent in the rotation axis direction and it is the flat surface, an area is large and the PV value can be small. Therefore, the wear of the outer wall surface of the pocket can be restricted and the long life of the thrust roller bearing can be implemented.

Preferably, the pocket is in the shape of approximately a rectangle. In this constitution, the pocket can hold a cylindrical roller, a needle roller or a long roller so as to follow the shape of the roller, so that the roller can roll smoothly.

Further preferably, the leaning amount of the outer wall surface of the pocket toward the inner side or outer side in a diameter direction is not more than 50 μm, and still further preferably, it is not more than 20 μm. In this constitution, it can be prevented that the outer end face of the roller is partially in contact with the outer wall surface of the pocket. Therefore, the wear of the outer wall surface of the pocket can be restricted.

Further preferably, the amount processed by the ironing in the center of the outer wall surface of the pocket in a peripheral direction is not more than 10% of the thickness of the retainer. The ironing is performed to shape the surface of the plate such that the plate thickness of the retainer is reduced. Here, when the amount processed by the ironing, that is, the reduced amount is increased, the retainer becomes thin and the strength of the outer wall surface of the pocket could be insufficient. Especially, since the outer wall surface of the pocket is the flat surface, the thickness in the center in the peripheral direction is the smallest. Thus, it is likely that this point does not have sufficient strength and damaged. However, when the amount processed by the ironing in the center of the outer wall surface of the pocket in the peripheral direction is not more than 10% of the thickness of the retainer, the thickness in the center of the pocket in the peripheral direction in the outer wall surface of the pocket can be ensured minimally and the strength can be maintained.

Further preferably, the outer end face of the roller is a flat surface. Thus, when the outer end face of the roller comes to be in contact with the outer wall surface of the pocket, since both flat surfaces are in contact with each other, the contact surface is large. Therefore, the PV value can be small and the wear resistance can be improved.

According to the present invention, when the outer end face of the roller abuts on the outer wall surface of the pocket while the roller rolls, the outer end face of the roller abuts on the surface processed by the ironing. Since the surface processed by the ironing is smooth and the degree of its surface roughness is high, drilling wear can be restricted. In addition, since the outer wall surface of the pocket is comprised of the outer flange part bent in the rotation axis direction, an area is large and the PV value can be small. Therefore, the wear of the outer wall surface of the pocket can be restricted and the long life of the thrust roller bearing can be implemented.

In addition, according to the present invention, when the outer end face of the roller abuts on the outer wall surface of the pocket while the roller rolls, the outer end face of the roller abuts on the surface processed by the ironing. Since the surface processed by the ironing is smooth and the degree of its surface roughness is high, drilling wear can be restricted. In addition, since the outer wall surface of the pocket is comprised of the outer flange part bent in the rotation axis direction, an area is large and the PV value can be small. Furthermore, since the outer wall surface of the pocket is the curved surface dented to the outer periphery so as to follow the inner surface of the outer flange part, the thickness of the wall surface in the diameter direction can be approximately uniform. Thus, the strength of the wall surface can be prevented from being lowered partially. Therefore, the wear of the outer wall surface of the pocket can be restricted and the long life of the thrust roller bearing can be implemented.

Furthermore, according to the present invention, when the outer end face of the roller abuts on the outer wall surface of the pocket while the roller rolls, the outer end face of the roller abuts on the surface processed by the ironing. Since the surface processed by the ironing is smooth and the degree of its surface roughness is high, drilling wear can be restricted. In addition, since the outer wall surface of the pocket is comprised of the outer flange part bent in the rotation axis direction and it is the flat surface, an area is large and the PV value can be small. Therefore, the wear of the outer wall surface of the pocket can be restricted and the long life of the thrust roller bearing can be implemented.

BRIEF DESCRIPTION OF THE DRAWINGS

FIG. 3 is a sectional view showing the thrust roller bearing in FIG. 2 taken along a line III-O-III in FIG. 2;

FIG. 4 is an enlarged view showing a part IV in FIG. 2 in the thrust roller bearing shown in FIG. 2;

FIG. 5 is an enlarged view showing a state in which the outer end face of a roller abuts on the outer wall surface of the pocket seen from the axial direction;

FIG. 17 is a schematic view when the ironing is performed.

DESCRIPTION OF THE PREFERRED EMBODIMENTS

Figure 1:
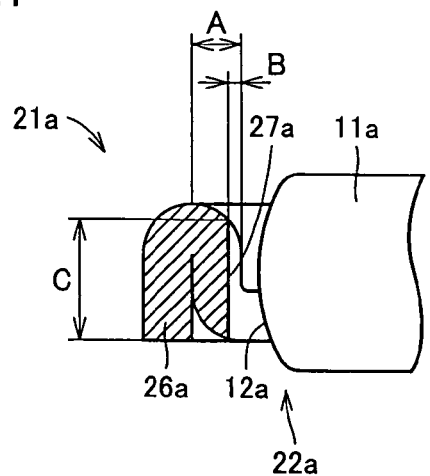
FIG. 1 is an enlarged sectional view showing the vicinity of the outer wall surface of a pocket in a thrust roller bearing according to one embodiment of the present invention.
Figure 2:
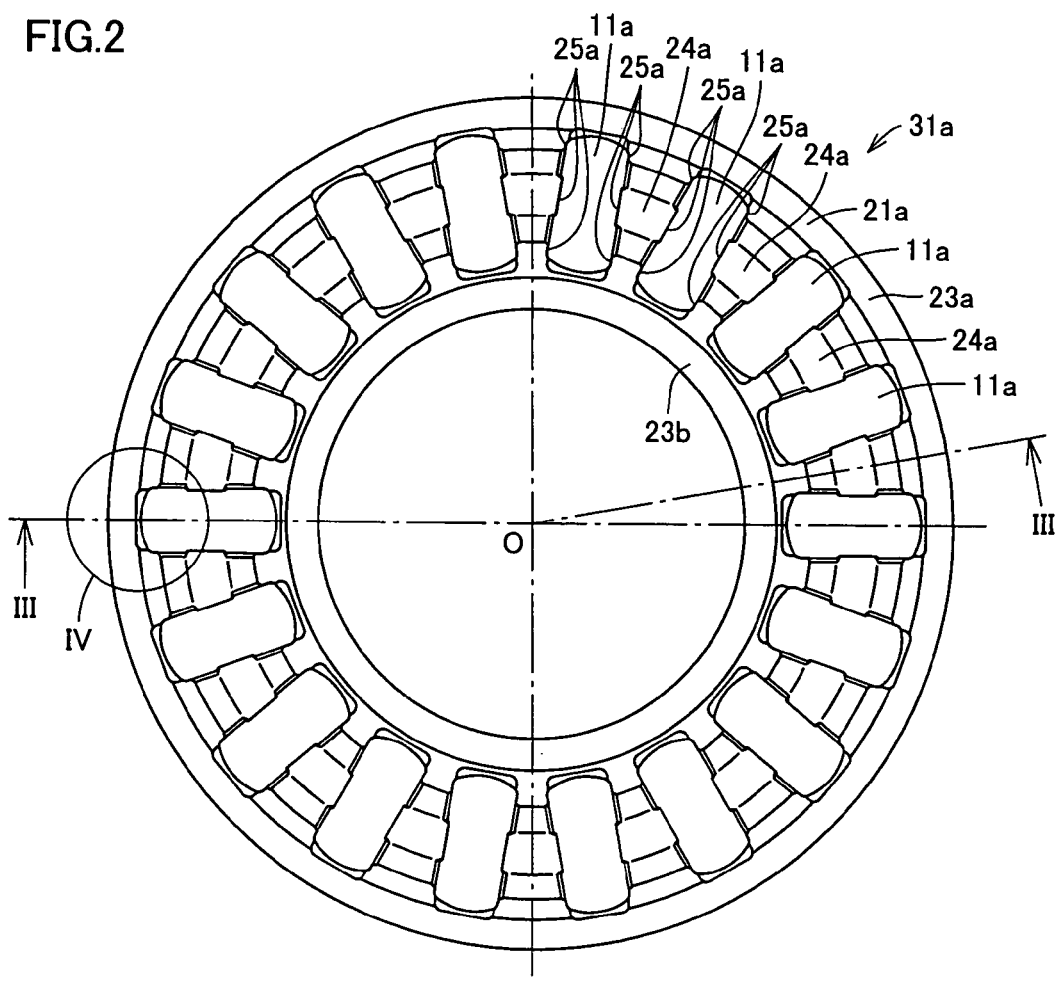
FIG. 2 is a view showing the thrust roller bearing according to one embodiment of the present invention seen from an axial direction.

Embodiments of the present invention will be described with reference to the drawings hereinafter. First, a thrust roller bearing according to one embodiment of the present invention will be described. FIG. 2 is a view showing the thrust roller bearing according to one embodiment of the present invention seen from the axial direction. FIG. 3 is a sectional view showing the thrust roller bearing in FIG. 2 taken along a line III-O-III in FIG. 2. FIG. 4 is an enlarged view showing a part IV in FIG. 2. FIG. 1 is an enlarged view showing a part I in FIG. 3.

Referring to FIGS. 1 to 4, a thrust roller bearing 31a comprises a plurality of rollers 11a and a retainer 21a for retaining the plurality of rollers 11a. An end face 12a of the roller 11a is an end face in which the center in a diameter direction is projected in the rolling axis direction and its section has the same curvature.

The retainer 21a is formed of a disk-shaped member and comprises a pair of annular parts 23a and 23b and a plurality of pillar parts 24a for connecting the pair of annular parts 23a and 23b so as to form pockets 22a for holding the rollers 11a. The plurality of pocket 22a are provided in a radial manner around the rotation axis. Each pocket 22a is provided with a roller stopper 25a for preventing the roller 11a from escaping. In addition, the pocket 22a is provided with some play for allowing the movement of the roller 11a. The roller 11a can move in the rotation axis direction, diameter direction and peripheral direction in the pocket 22a within an allowable range and the play range in which the roller can move is determined by the roller stopper 25a and the like.

The center of the pillar part 24a in the diameter direction is bent so as to be folded back in the rotation axis direction. In addition, outer and inner flanges parts 26a and 26b of the retainer 21a are also bent so as to be folded back in the rotation axis direction. The sectional views of the flange parts 26a and 26b and the pillar part 24a are in the form of "W" approximately (refer to FIG. 3). The outer flange part 26a bent in the rotation axis direction is positioned at an outer wall surface 27a of the pocket 22a. Namely, the outer flange part 26a bent in the rotation axis direction forms the outer wall surface 27a of the pocket 22a.

Here, the outer wall surface 27a of the pocket 22a is processed by the ironing. For example, the ironing is performed such that a male ironing jig having an ironing arm and a female ironing jig having an ironing grove are used and the retainer 21a is set on the female ironing jig, and the outer flange part 26a bent in the rotation axis direction is shaved off with the male ironing jig pressed forward in a perpendicular direction. The outer wall surface 27a of the pocket 22a processed by the ironing is smoother than a surface punched by a punch and the like and the surface of the retainer 21a and its surface roughness is preferable. In addition, the inner wall surface 27b of the pocket 22a is not processed by the ironing.

When the roller 11a rolls, the roller 11a moves toward the outer periphery due to centrifugal force and the like. At this time, the outer end face 12a of the roller 11a abuts on the outer wall surface 27a of the pocket 22a.

Figure 6:
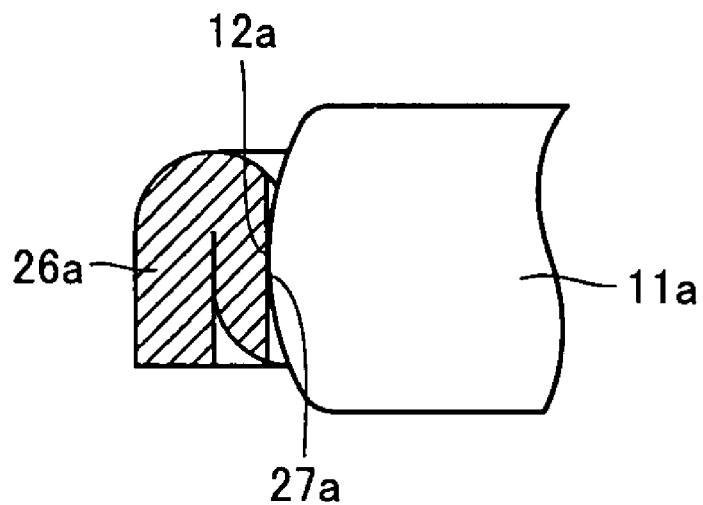
FIG. 6 is an enlarged sectional view showing the state in which the outer end face of the roller abuts on the outer wall surface of the pocket.

FIG. 5 is a view showing the state in which the outer end face 12a of the roller 11a abuts on the outer wall surface 27a of the pocket 22a, which corresponds to FIG. 4. In addition, FIG. 6 is an enlarged sectional view showing the thrust roller bearing 31a in this case, which corresponds to FIG. 1. Referring to FIGS. 5 and 6, the outer end face 12a of the roller 11a abuts on the outer wall surface 27a of the pocket 22a. More specifically, the most projected part of the end face 12a of the roller 11a in the rolling axis direction abuts on the vicinity of the center, in the rotation axis direction and diameter direction, in the outer wall surface 27a of the pocket 22a.

Since the outer wall surface 27c of the pocket 22c is processed by the ironing and its surface roughness is preferable, even when the end face 12c of the roller 11c abuts on it, drilling wear of the outer wall surface 27c of the pocket 22c can be restricted. In addition, since the outer wall surface 27c of the pocket 22c is the flange part 26c bent in the rotation axis direction, an area more than the thickness of the retainer 21c can be provided. In this case, since the outer wall surface 27c of the pocket 22c is flat and the outer end face 12c of the roller 11c is a flat end face, they can be in contact with each other over a large area. As a result, since a contact surface pressure can be low, the PV value provided by multiplying a contact surface pressure P by slipping velocity can be lowered.

Therefore, the pocket 22a can hold the roller 11a stably for a long time, and the thrust roller bearing 31a containing such retainer 21a can implement a long life.

Figure 7:
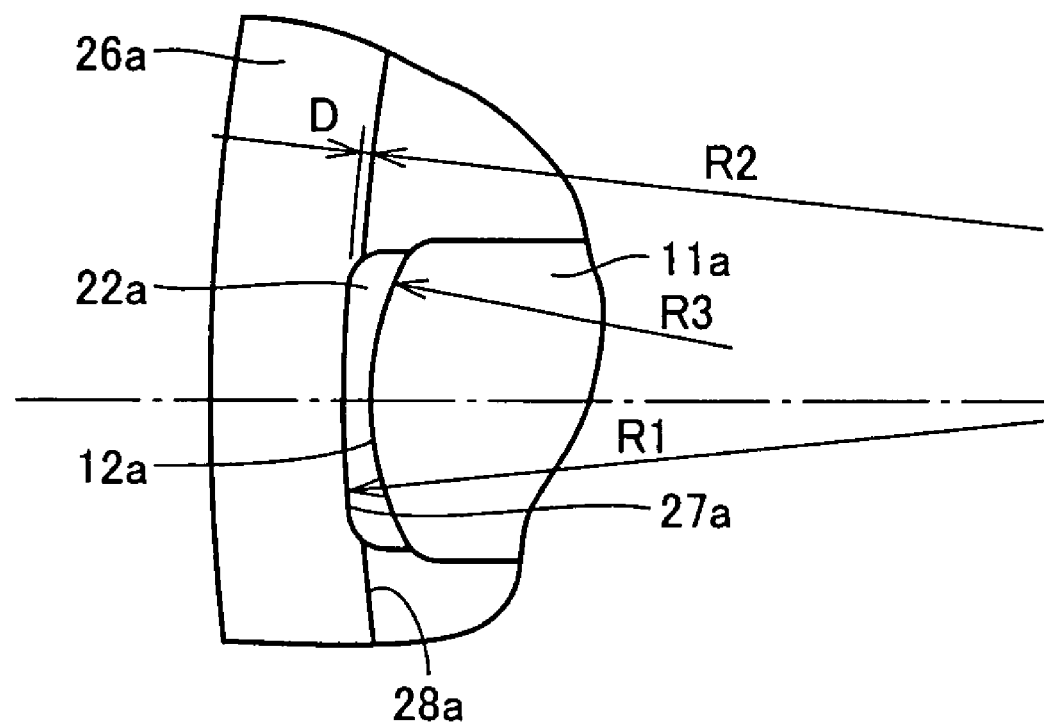
FIG. 7 is an enlarged view showing the vicinity of the outer wall surface of the pocket.

Furthermore, as shown in FIG. 7, the outer wall surface 27a of the pocket 22a is a curved surface that is dented to the outer periphery so as to follow an inner surface 28a of the outer flange part 26a and may be processed by the ironing. In this constitution, the outer wall surface 27a of the pocket 22a and the outer end face 12a of the roller 11a can be preferably in contact with each other.

That is, in this case, since the outer wall surface 27a of the pocket 22a is dented to the outer periphery, the thickness of the outer wall surface 27a of the pocket 22a can be approximately uniform in the peripheral direction of the pocket 22a. Thus, since the strength is not lowered partially in the outer wall surface 27a of the pocket 22a, damage can be prevented.

As a result, the pocket 22a can hold the roller 11a stably for a long and the thrust roller bearing 31a containing such retainer 21a can implement a long life.

In addition, when it is assumed that the curvature radius of the outer wall surface 27a of the pocket 22a processed by the ironing is R1(mm), the curvature radius of the inner surface 28a of the outer flange part 26a bent in the rotation axis direction is R2 (mm), and the distance between the inner surface 28a of the outer flange part 26a and the outer wall surface 27a of the pocket 22a in the diameter direction is D (mm), it is preferable that the relation such that R1=R2±10 mm+D is implemented. In this constitution, the shape of the outer wall surface 27a of the pocket 22a can be appropriately provided and the behavior of the roller 11a can be stabilized.

Furthermore, when it is assumed that the curvature radius of the outer end face 12a of the roller 11a is R3 (mm), it is also preferable that the relation such that R1>R3 is implemented. In this constitution, since only the most projected part of the outer end face 12a of the roller 11a having a small peripheral speed and the outer wall surface 27a of the pocket 22a can be in contact with each other, wear resistance can be improved.

In addition, the length of the play of the roller 11a in the rotation axis direction is to be shorter than a length C of the surface processed by the ironing in the rotation axis direction in the above embodiment (refer to FIG. 1). Thus, since the play is provided in the pocket 22a as described above, even when the roller 11a moved in the rotation axis direction while rolling within the range of the play, the outer end face 12a of the roller 11a and the outer wall surface 27a of the pocket 22a processed by the ironing can be surely contacted.

Furthermore, it is preferable that the amount processed by the ironing for the pocket 22a is not more than 20% of the thickness of the retainer 21a. That is, when it is assumed that the thickness of the retainer 21a is A and the amount processed by the ironing for the wall surface of the pocket 22a is B, the amount B processed by the ironing is to be not more than 20% of the thickness A in FIG. 1. When the amount processed by the ironing is increased, the retainer 21a decreases in thickness. In this case, the strength of the outer wall surface 27a of the pocket 22a is lowered. Therefore, the strength of the wall surface 27a can be maintained by setting the amount processed by the ironing is to be not more than 20% of the thickness A.

Figure 8:
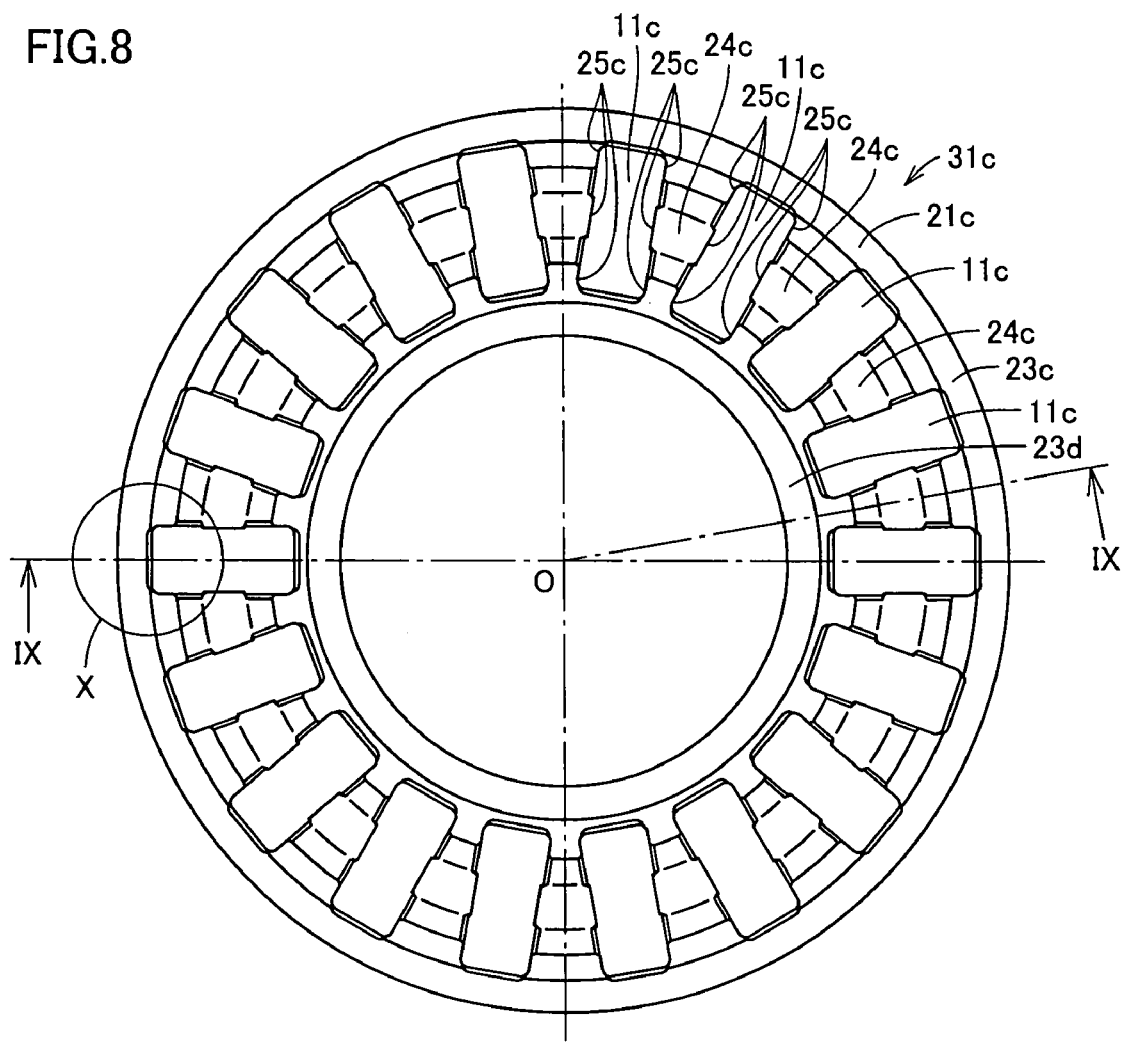
FIG. 8 is a view showing a thrust roller bearing according to another embodiment seen from an axial direction.
Figure 9:
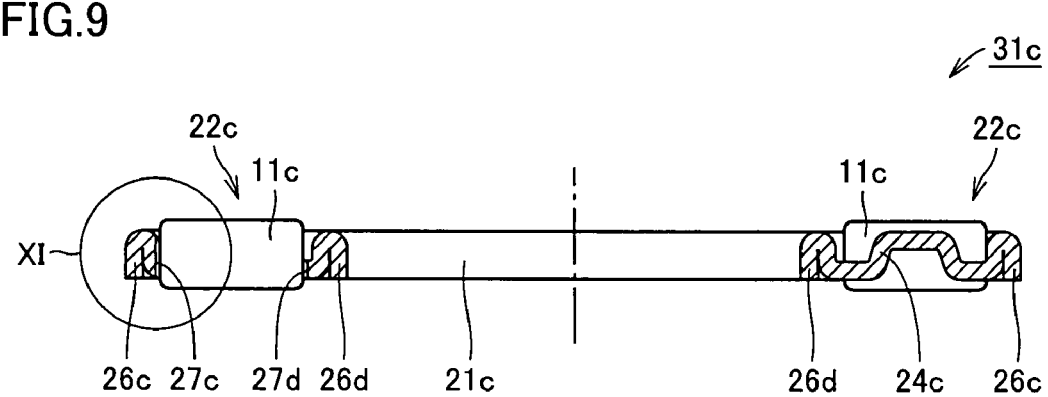
FIG. 9 is a sectional view showing the thrust roller bearing shown in FIG. 8 taken along a line IX-O-IX in FIG. 8.
Figure 10:
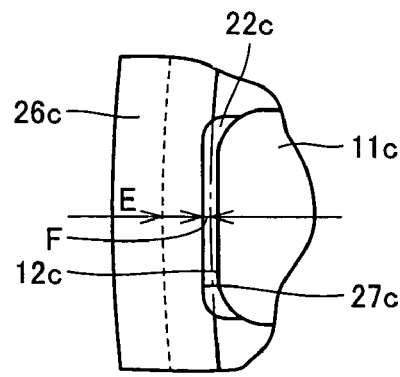
FIG. 10 is an enlarged view showing the vicinity of the outer wall surface of a pocket in the thrust roller bearing according to another embodiment of the present invention.
Figure 11:
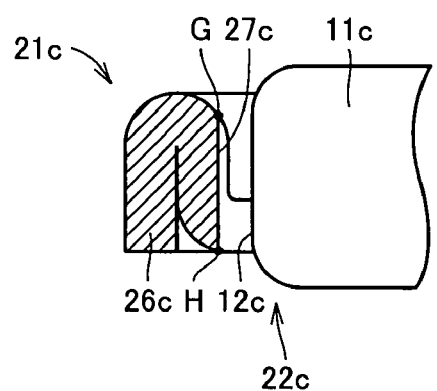
FIG. 11 is an enlarged view showing a part XI in FIG. 9 in the thrust roller bearing shown in FIG. 9.

Next, another embodiment of the present invention will be described. FIG. 8 is a view showing a thrust roller bearing according to another embodiment seen from the axis direction. FIG. 9 is a sectional view showing the thrust roller bearing shown in FIG. 8 taken along a line IX-O-IX in FIG. 8. FIG. 10 is an enlarged view showing a part X in FIG. 8. FIG. 11 is an enlarged view showing a part XI in FIG. 10.

Referring to FIGS. 8 to 11, a thrust roller bearing 31c comprises a plurality of rollers 11c and a retainer 21c for retaining the plurality of rollers 11c. An end face 12c of the roller 11c is a flat end face. In addition, a cylindrical roller is used as the roller 11c here.

The retainer 21c is formed of a disk-shaped member and comprises a pair of annular parts 23c and 23d, and a plurality of pillar parts 24c for connecting the pair of annular parts 23c and 23d so as to form pockets 22c for holding the rollers 11c. The plurality of pockets 22c are provided in a radial manner around the rotation axis. Each pocket 22c is provided with a roller stopper 25c for preventing the roller 11c from escaping. In addition, the pocket 22c is provided with some play for allowing the movement of the roller 11c. The roller 11c can move in the rotation axis direction, diameter direction and peripheral direction in the pocket 22c within an allowable range and the play range in which the roller can move is determined by the roller stopper 25c and the like.

The center of the pillar part 24c in the diameter direction is bent so as to be folded back in the rotation axis direction. In addition, outer and inner flange parts 26c and 26d of the retainer 21c are also bent so as to be folded back in the rotation axis direction. The sectional views of the flange parts 26c and 26d and the pillar part 24c are in the form of "W" approximately (refer to FIG. 9). The outer flange part 26c bent in the rotation axis direction is positioned at an outer wall surface 27c of the pocket 22c. Namely, the outer flange part 26c bent in the rotation axis direction forms the outer wall surface 27c of the pocket 22c.

Here, the outer wall surface 27c of the pocket 22c is a flat surface and processed by the ironing. It is preferable that the outer wall surface 27c of the pocket 22 is a plane that is perpendicular to the rolling axis of the roller 11c. Thus, as will be described below, when it abuts on the outer end face 12c of the roller 11c, preferable abutment can be implemented.

For example, the ironing is performed such that a male ironing jig having an ironing arm and a female ironing jig having an ironing grove are used and the retainer 21c is set on the female ironing jig, and the outer flange part 26c bent in the rotation axis direction is shaved off with the male ironing jig pressed forward in a perpendicular direction. The outer wall surface 27c of the pocket 22c processed by the ironing is smoother than a surface punched by a punch and the like and the surface of the retainer 21c and its surface roughness is preferable. In addition, the inner wall surface 27d of the pocket 22c is not processed by the ironing.

When the roller 11c rolls, the roller 11c moves toward the outer periphery due to centrifugal force and the like. At this time, the outer end face 12c of the roller 11c abuts on the outer wall surface 27c of the pocket 22c.

Figure 12:
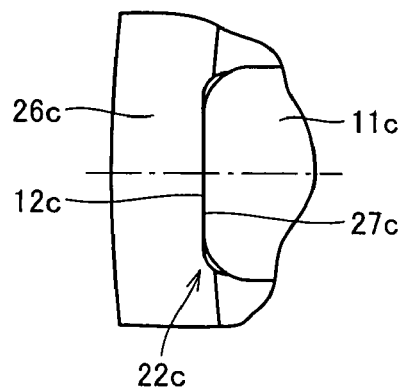
FIG. 12 is an enlarged view showing a state in which the outer end face of a roller abuts on the outer wall surface of the pocket seen from the axial direction.
Figure 13:
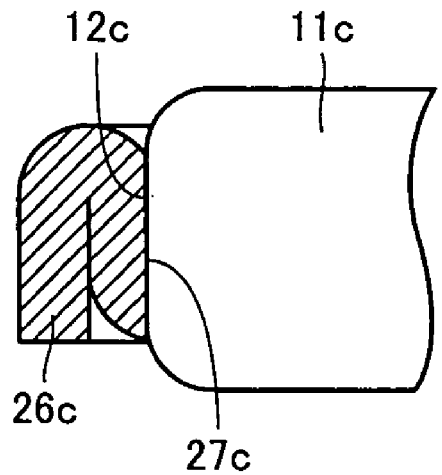
FIG. 13 is an enlarged sectional view showing the state in which the outer end face of the roller abuts on the outer wall surface of the pocket.

FIG. 12 is a view showing the state in which the outer end face 12c of the roller 11c abuts on the outer wall surface 27c of the pocket 22c, which corresponds to FIG. 10. In addition, FIG. 13 is an enlarged sectional view showing the thrust roller bearing 31c in this case, which corresponds to FIG. 11. Referring to FIGS. 12 and 13, the outer end face 12c of the roller 11c abuts on the outer wall surface 27c of the pocket 22c.

Since the outer wall surface 27c of the pocket 22c is processed by the ironing and its surface roughness is preferable, even when the end face 12c of the roller 11c abuts on it, drilling wear of the outer wall surface 27c of the pocket 22c can be restricted. In addition, since the outer wall surface 27c of the pocket 22c is the flange part 26c bent in the rotation axis direction, an area more than the thickness of the retainer 21c can be provided. In this case, since the outer wall surface 27c of the pocket 22c is flat and the outer end face 12c of the roller 11c is the F end face, they can be in contact with each other over a large area. As a result, since a contact surface pressure can be low, the PV value provided by multiplying a contact surface pressure P by slipping velocity can be lowered.

Therefore, the pocket 22c can hold the roller 11c stably for a long time, and the thrust roller bearing 31c containing such retainer 21c can implement a long life.

Furthermore, the length of the play of the roller 11c in the rotation axis direction is preferably shorter than that of the surface processed by the ironing in the rotation axis direction. As described above, since the play is provided in the pocket 22c, even when the roller 11c moved in the rotation axis direction while rolling within the range of the play, the outer end face 12c of the roller 11c and the outer wall surface 27c of the pocket 22c processed by the ironing can be surely contacted.

Here, it is preferable that the pocket 22c is approximately rectangular viewed from the rotation axis direction. In this constitution, it can follow the shape of the roller 11c held by the pocket 22c, so that the roller 11c can roll smoothly.

Furthermore, it is preferable that the amount processed by the ironing in the center of the outer wall surface 27c of the pocket 22c in the peripheral direction is not more than 10% of the thickness of the retainer 21c. That is, when it is assumed that the thickness of the retainer 21c is E and the amount processed by the ironing in the center of the outer wall surface 27c of the pocket 22c in the peripheral direction is F in FIG. 10, the amount F processed by the ironing is to be not more than 10% of the thickness E. When the amount processed by the ironing is increased, the retainer 21c decreases in thickness. In this case, the strength of the outer wall surface 27c of the pocket 22c is lowered. Especially, since the outer wall surface 27c of the pocket 22c is the flat surface, the thickness in the center is different from that at the end, that is, at the part on the side wall surface side in the peripheral direction of the pocket 22c, in the outer wall surface 27c of the pocket 22c, so that the thickness in the center of the pocket in the peripheral direction is thinner. In this case, the strength is not sufficient at this thin part and the outer wall surface 27c of the pocket 22c could be damaged. However, when the amount F processed by the ironing in the center in the peripheral direction is set to be not more than 10% of the thickness E, the thickness in the center of the pocket 22c in the peripheral direction in the outer wall surface 27c of the pocket 22c can be maintained minimally and the strength can be ensured.

Furthermore, it is preferable that the leaning amount of the outer wall surface 27c of the pocket 22c to the inner side or outer side in the diameter direction is not more than 50 µm and it is more preferable that it is not more than 20 µm. In a case where the outer wall surface 27c of the pocket 22c leans largely to the inner or outer side in the diameter direction, when it is in contact with the outer end face 12c of the pocket 22c, they are partially in contact with each other. More specifically, in the outer end face 12 of the roller 11c, only an upper part or lower part in the rotation axis direction is in contact with the outer wall surface 27c of the pocket 22c. In this case, the outer end face 12c of the roller 11c abuts on the outer wall surface 27c of the pocket 22c partially, which causes the outer wall surface 27c of the pocket 22c to be worn partially. However, in the above constitution, the outer end face 12c of the roller 11c and the outer wall surface 27c of the pocket 22c can be prevented from being in contact partially. Therefore, the outer wall surface 27c of the pocket 22c can be prevented from being worn. In addition, the leaning amount means the distance between a point G and a point H in the retainer 21c in the diameter direction in the outer wall surface 27c of the pocket 22c in FIG. 11.

Figure 14:
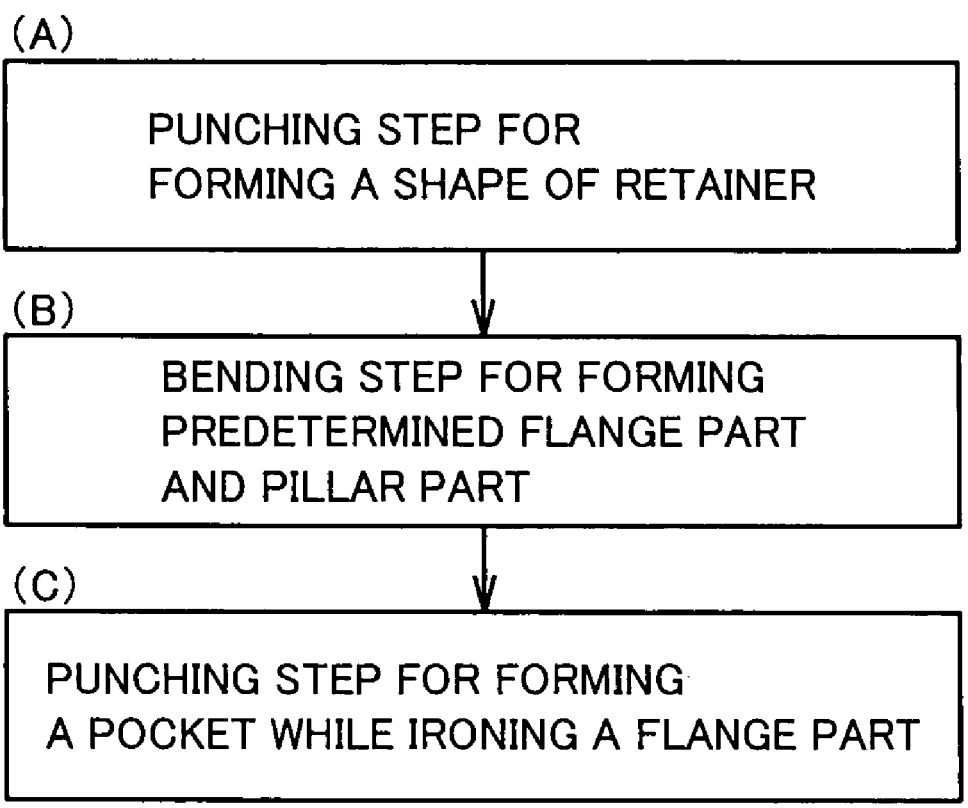
FIG. 14 is a flowchart showing representative steps in the manufacturing steps of a retainer contained in the manufacturing method of the thrust roller bearing according to one embodiment of the present invention.
Figure 15:
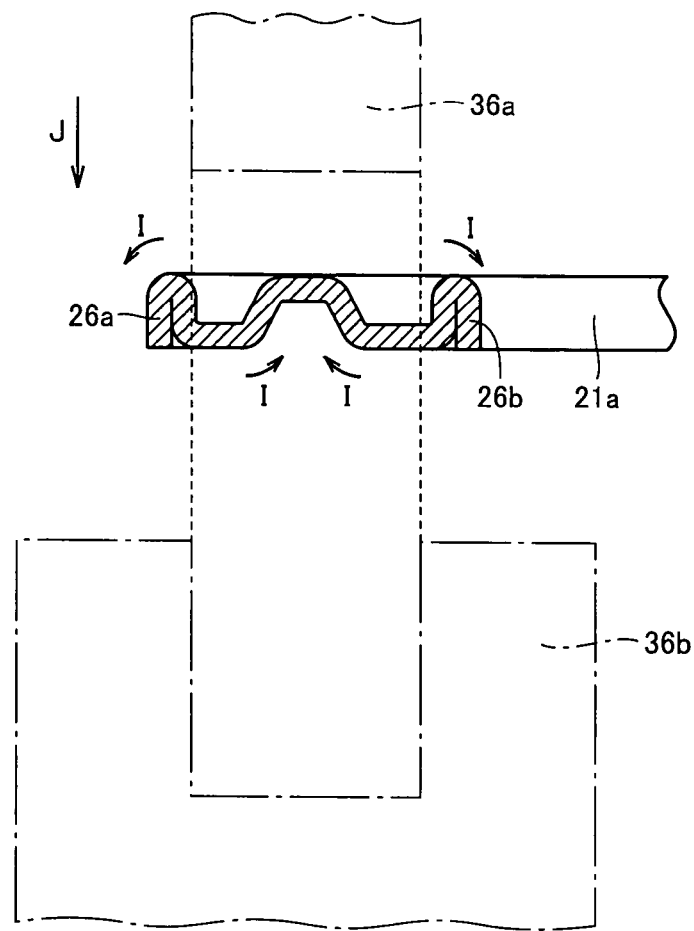
FIG. 15 is a schematic view when a pocket forming step and the ironing are performed at the same time.

Next, a method for manufacturing the above retainer 21a and the like will be described. FIG. 14(A) to 14(C) is a flowchart showing representative steps in the manufacturing method of the retainer 21a. In addition, FIG. 15 is a schematic view in the case where a pocket forming step that will be described later and the ironing step are performed at the same time.

Referring to FIGS. 14(A) to 14(C) and FIG. 15, the retainer 21a is punched out along its shape from an iron plate that is the material of the retainer 21a by a punch and the like (FIG. 14(A)). Then, the outer flange part 26a, the inner flange part 26b and the center of the pillar part 24a of the retainer 21a are bent by pressing and the like so as to be folded back in the rotation axis direction as shown by arrows I in FIG. 15 (FIG. 14(B)). That is, a flange part bending step is performed for the outer and inner flange parts 26a and 26b and a V shape bending step is performed for the pillar part 24a such that its section becomes a V shape. Then, pockets are punched out such that the inner surface of the bent outer flange part 26a becomes the outer wall surface 27a of the pocket 22a while the ironing is performed (14(C)). Here, this step is comprised of the pocket forming step and the ironing. The pocket forming step and the ironing are performed such that a male ironing jig 36a having an ironing arm and a female ironing jig 36b having an ironing grove are used and the retainer 21a is set on the female ironing jig 36b and the outer flange part 26a bent in the rotation axis direction is shaved off with the male ironing jig 36a pressed forward in a direction shown by an arrow J in FIG. 15. Thus, each pocket 22a is formed in the retainer 21a, whereby the retainer 21a is manufactured. The plurality of rollers 11a are incorporated in the retainer 21a thus manufactured, whereby the thrust roller bearing 31a is manufactured.

According to the above manufacturing method, since the center of the pillar part 24a and the flange parts 26a and 26b are bent so as to be folded back in the rotation axis direction before the pocket forming step, the pocket can be formed with high precision. Especially, even when the roller 11a has a small diameter, the outer wall surface 27a of the pocket 22a with which the outer end face 12a of the roller 11a is in contact can be surely provided.

Furthermore, since the pillar part 24a is bent so as to have the V-shaped section, it can hold the roller 11a easily.

Still furthermore, since the pocket forming step and the ironing are performed at the same time, a time and facility required for the manufacturing can be saved, so that the thrust roller bearing can be effectively manufactured.

Figure 16:
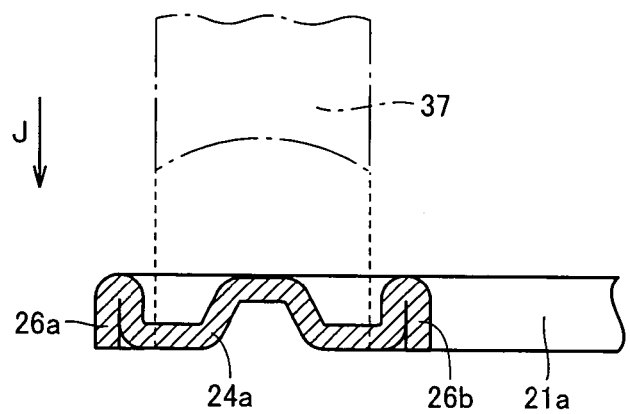
FIG. 16 is a schematic view when a pocket forming step is performed.

In addition, the ironing may be performed after the pocket forming step. FIGS. 16 and 17 are schematic views of a pocket forming step (FIG. 16) and the ironing (FIG. 17) in this case. First, referring to FIG. 16, the flange part bending step is performed for the outer and inner flange parts 26a and 26b and the V shape bending step is performed for the pillar part 24a such that its section becomes a V shape and then a predetermined area of the retainer 21a is punched out in the rotation axis direction, that is, in the direction shown by an arrow J in FIG. 16 by a punch 37 to form the pocket. Then, referring to FIG. 17, the inner surface of the flange part 26a that becomes the outer wall surface of the pocket 22a is processed by the ironing using the jig comprising the male ironing jig 36a and the female ironing jig 36b. Thus, in this case also, the retainer 21a having the above constitution can be manufactured.

Here, as for the configuration of the outer wall surface 27a of the pocket 22a, it may be a flat surface as shown in the thrust roller bearing according to another embodiment of the present invention or it may be a curved surface dented to the outer peripheral direction so as to follow the inner surface of the flange part 26a.

In addition, although only the outer wall surface of the pocket is processed by the ironing in the above embodiment, the present invention is not limited to this. For example, the inner wall surface of the pocket may be also processed by the ironing. In this case, the wear caused by the contact between the inner wall surface of the pocket and the inner end face of the roller can be restricted and a longer life can be expected.

Furthermore, although the outer and inner flange parts are bent so as to be folded back in the above embodiment, the present invention is not limited to this. For example, they may be folded in one direction.

Still furthermore, although the end face of the roller is a curved end face or a flat end face in the above embodiment, the present invention is not limited to this. For example, the roller may have an end face comprising a plurality of curved surfaces having different curvature radiuses or a rounded end face.

Although the embodiments of the present invention have been described with reference to the drawings in the above, the present invention is not limited to the above-illustrated embodiments. Various kinds of modifications and variations may be added to the illustrated embodiments within the same or equal scope of the present invention.

Since the thrust roller bearing according to the present invention is superior in wear resistance and implements a long life, it can be effectively applied to a compressor for a car air conditioner, an automatic transmission, a manual transmission and a hybrid car.

What is claimed is:

1. A thrust roller bearing comprising:
a plurality of rollers; and
a disk-shaped retainer having a plurality of pockets for holding said plurality of rollers and having an outer flange part bent in a rotation axis direction, wherein
the disk-shaped retainer is formed by bending a disk-shaped member,
a surface positioned on an inner side of said outer flange part comprises an outer wall surface of said pocket and is reduced in thickness compared to a thickness of the outer flange part positioned between two pockets, and,
a length of the surface of the outer flange part in the rotation axis direction is longer than a thickness of the disk-shaped member.

2. The thrust roller bearing according to claim 1, wherein the outer wall surface of said pocket is processed by ironing.

3. The thrust roller bearing according to claim 2, wherein a length of play for said roller in the rotation axis direction is shorter than a length of said outer wall surface processed by the ironing in the rotation axis direction.

4. The thrust roller bearing according to claim 2, wherein an amount processed by the ironing for said outer wall surface is not more than 20% of a thickness of said retainer.

5. The thrust roller bearing according to claim 2, wherein the surface roughness, Ra, of said outer wall surface processed by the ironing is not more than 2 μm.

6. The thrust roller bearing according to claim 2, wherein, an amount processed by the ironing in the center of the outer wall surface of said pocket in a peripheral direction is not more than 10% of the thickness of said retainer.

7. The thrust roller bearing according to claim 2, wherein when a curvature radius of said outer wall surface processed by the ironing is R1(mm), a curvature radius of the inner surface of said outer flange part bent in the rotation axis direction between two pockets is R2(mm), a distance between the inner surface of said outer flange part between two pockets and the outer wall surface of said pocket in the diameter direction is D (mm), a relation R1=R2±10 mm+D is satisfied.

8. The thrust roller bearing according to claim 7, wherein when a curvature of an outer end face of said roller is R3 (mm), a relation such that R1>R3 is satisfied.

9. The thrust roller bearing according to claim 1, wherein an outer end face of said roller has a curved surface projected in a rolling axis direction.

10. The thrust roller bearing according to claim 1, wherein the an outer wall surface of said pocket is a curved surface having a radius of curvature greater than a radius of curvature of the inner surface of said outer flange part between two pockets.

11. The thrust roller bearing according to claim 10, wherein an outer end face of said roller has a curved surface projected in the rolling axis direction.

12. The thrust roller bearing according to claim 1, wherein the outer wall surface of said pocket is a flat surface.

13. The thrust roller bearing according to claim 12, wherein said pocket is in the shape of approximately a rectangle.

14. The thrust roller bearing according to claim 12, wherein an outer end face of said roller is a flat surface.

15. The thrust roller bearing according to claim 12, wherein a leaning amount of the outer wall surface of said pocket toward the inner side of the flange part or an outer side of the flange part in a diameter direction is not more than 50 μm.

16. The thrust roller bearing according to claim 15, wherein said leaning amount is not more than 20 μm.

* * * * *